(12) United States Patent
Atteberry et al.

(10) Patent No.: US 9,442,898 B2
(45) Date of Patent: Sep. 13, 2016

(54) ELECTRONIC DOCUMENT THAT INHIBITS AUTOMATIC TEXT EXTRACTION

(75) Inventors: Tracy Atteberry, Chicago, IL (US); Harry Shaun Lippy, Chicago, IL (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 582 days.

(21) Appl. No.: 13/550,696

(22) Filed: Jul. 17, 2012

(65) Prior Publication Data
US 2014/0022260 A1   Jan. 23, 2014

(51) Int. Cl.
*G06F 17/22* (2006.01)
*G06F 17/21* (2006.01)
*G06T 11/20* (2006.01)
*G06F 21/62* (2013.01)
*G09G 5/24* (2006.01)

(52) U.S. Cl.
CPC ......... *G06F 17/214* (2013.01); *G06F 17/2217* (2013.01); *G06F 21/6209* (2013.01); *G06T 11/203* (2013.01); *G09G 5/24* (2013.01); *G09G 2370/027* (2013.01)

(58) Field of Classification Search
CPC ............... G06F 17/2217; G09G 5/24; G09G 2370/027
USPC ........................................................ 345/467
See application file for complete search history.

(56) References Cited

U.S. PATENT DOCUMENTS

| | | | | |
|---|---|---|---|---|
| 5,338,043 A * | 8/1994 | Rehm | ..................... | A63F 3/0421 273/153 R |
| 5,526,477 A * | 6/1996 | McConnell | ............ | G06K 7/143 345/467 |
| 5,715,473 A * | 2/1998 | Reed | ..................... | G06F 17/214 715/210 |
| 6,504,545 B1 * | 1/2003 | Browne | ................ | G06F 17/214 345/473 |
| 6,993,662 B2 * | 1/2006 | Rubin | ................... | G06F 17/211 715/205 |
| 7,420,692 B2 * | 9/2008 | Bourret | ................... | G06F 21/10 358/1.1 |
| 8,330,760 B1 * | 12/2012 | Arnold | .................. | G06T 11/203 345/467 |
| 8,402,371 B2 * | 3/2013 | Tang | ..................... | G06T 1/0021 715/256 |
| 8,762,828 B2 * | 6/2014 | Le Henaff | ............. | G06F 17/211 715/211 |
| 9,081,529 B1 * | 7/2015 | Joshi | ..................... | G06F 17/214 |
| 2004/0001606 A1 * | 1/2004 | Levy | ............................ | 382/100 |
| 2005/0005122 A1 * | 1/2005 | Abraham | ............... | G06K 19/06 713/176 |
| 2006/0171588 A1 * | 8/2006 | Chellapilla | .......... | G06K 9/6828 382/185 |
| 2007/0200852 A1 * | 8/2007 | Ng | ........................ | G06T 11/203 345/467 |
| 2008/0028304 A1 * | 1/2008 | Levantovsky | ........ | G06F 17/214 715/269 |
| 2008/0049023 A1 * | 2/2008 | Opstad | .......................... | 345/467 |
| 2008/0301431 A1 * | 12/2008 | Hea | .......................... | G09C 1/02 713/150 |
| 2009/0109227 A1 * | 4/2009 | Leroy | ................... | G06F 17/214 345/467 |
| 2010/0164984 A1 * | 7/2010 | Rane et al. | .................... | 345/611 |

(Continued)

OTHER PUBLICATIONS

OpenType Font Specification, Microsoft Corporation, Copyright 2009, http://www.microsoft.com/typography/otspec/ (last visited Jul. 16, 2012).

(Continued)

*Primary Examiner* — Jacinta M Crawford
*Assistant Examiner* — Phong Nguyen
(74) *Attorney, Agent, or Firm* — Miles & Stockbridge P.C.

(57) ABSTRACT

A system that generates one or more fonts for a document is provided. Glyph data associated with the one or more fonts is modified in a way that modifies one or more glyphs, but does not affect how the one or more glyphs are displayed within the document. Subsequently, character mappings are created, where each character of a plurality of characters is mapped to one or more modified glyphs.

20 Claims, 4 Drawing Sheets

(56) References Cited

U.S. PATENT DOCUMENTS

| | | | |
|---|---|---|---|
| 2011/0188761 A1* | 8/2011 | Boutros | H04N 1/60 382/218 |
| 2011/0203000 A1 | 8/2011 | Bacus et al. | |
| 2012/0001922 A1* | 1/2012 | Escher | G06F 17/214 345/467 |
| 2012/0260108 A1* | 10/2012 | Lee | G06F 21/6218 713/191 |
| 2013/0027406 A1* | 1/2013 | Liu | G06F 17/214 345/467 |
| 2013/0174017 A1* | 7/2013 | Richardson et al. | 715/234 |

OTHER PUBLICATIONS

Apple TrueType Reference Manual, Apple Computer Inc., Copyright 1997-2002, https://developer.apple.com/fonts/TTRefMan/index.html (last visited Jul. 16, 2012).

Adobe Font Development Kit, Adobe Systems Incorporated, Copyright 2012, http://www.adobeaudience.com/devnet/opentype/afdko.html (last visited Jul. 16, 2012).

Converting Outlines to True Type Format, Apple Inc., Copyright 2011, http://developer.apple.com/fonts/TTRefMan/RM08/appendixE.html (last visited Jul. 16, 2012).

OpenType Font Specification, cmap—Character to Glyph Index Mapping Table, Microsoft Corporation, Copyright 2008, http://www.microsoft.com/typography/otspec/cmap.htm (last visited Jul. 16, 2012).

Apple TrueType Reference Manual, Chapter 1, Digitizing Letterform Designs, Apple Inc., Copyright 2011, https://developer.apple.com/fonts/TTRefMan/RM01/Chap1.html (last visited Jul. 16, 2012).

OpenType Font Specification, Chapter 1, TrueType Fundamentals, Microsoft Corporation, Copyright 1997, http://www.microsoft.com/typography/otspec/TTCH01.htm (last visited Jul. 16, 2012).

* cited by examiner

ELECTRONIC DOCUMENT THAT INHIBITS AUTOMATIC TEXT EXTRACTION

FIELD

One embodiment is directed to a computer system, and more particularly, to a computer system that publishes electronic documents.

BACKGROUND

Organizations often want to publish electronic documents (e.g., such as portable document format ("PDF") documents and hypertext markup language ("HTML") documents) on an open network, such as the Internet, and have those documents easily accessible, readable and printable by their target audiences without the use of special plug-ins. However, at the same time, organizations often do not want these documents to be machine searchable (and possibly indexed) by either commercial search engines or by competitors in an automated fashion.

SUMMARY

One embodiment is directed to a system that generates one or more fonts for a document. The system creates glyph data associated with each font of the one or more fonts, where the glyph data produces one or more glyphs that are displayed within the document. The system further modifies the glyph data, where the modified glyph data produces one or more modified glyphs, and where each modified glyph is substantially identical to a corresponding glyph when displayed within the document. The system further creates one or more character mappings, where each character mapping maps a unique character code of one or more unique character codes to a modified glyph of the one or more modified glyphs, where one or more instances of a character in the document are replaced with a unique character code of the one or more unique character codes.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
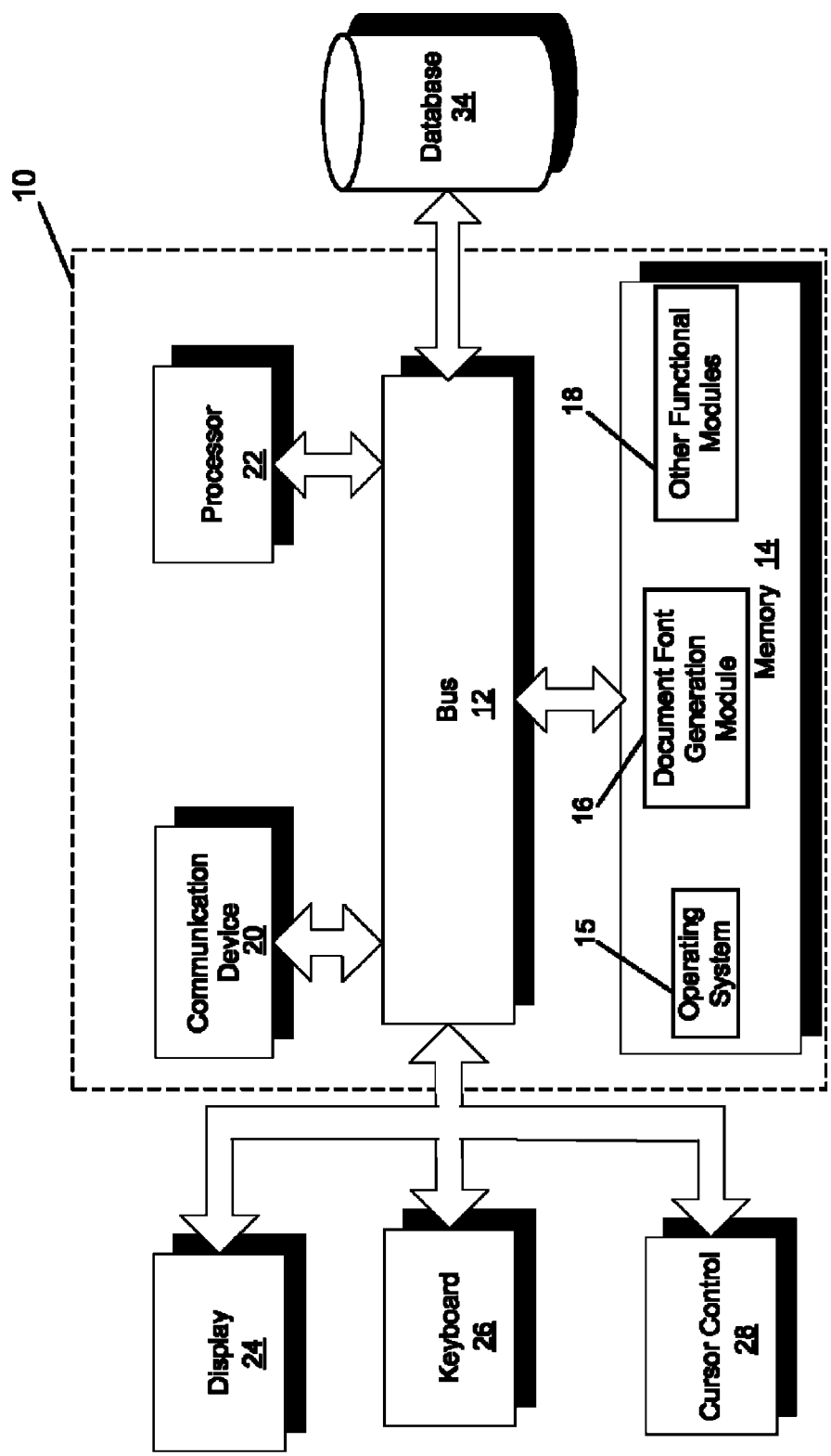
FIG. 1 illustrates a block diagram of a system that can implement an embodiment of the invention.

According to an embodiment, character maps for fonts that can be delivered with a document, such as embedded fonts, can be produced using a two-part process. In the first part, glyph data associated with the fonts is randomly "fuzzed" (i.e., the glyph drawing instructions and/or the (x, y) coordinates defining the glyph are modified), in a way that does not affect how the glyph is viewed by a human reader, but which affects how the glyph data is hashed, and thus, foils any attempt to hash the glyph data into the corresponding character map. In the second part, character mappings are created, where several characters are mapped to one or more "fuzzed" (i.e., modified) glyphs. Ideally, the number of character mappings can be equal to the number of times the character was used (per font, and per document). Thus, in one embodiment, the character mapping is equivalent to a one-time pad, a type of encryption proven to be impossible to crack. This approach is far more effective than, for example, a simple substitution cypher, which is easily recognized and cracked.

As previously described, organizations often want to make documents available and readable without special plug-ins, but do not want the documents to be machine-searchable by either search engines or their competition. Currently, solutions to this problem involve either compromising the accessibility, readability, or printability of the document (for example, by encryption, password protection, or the use of specialized plug-ins), or obfuscating the document format (such as a PDF or HTML format). The former is not desirable and the latter is difficult.

One known solution is to scramble a character mapping ("cmap") table of the embedded fonts in a PDF or an HTML document. In other words, a character code for 'C' might map to a glyph for 'W,' a character code for 'A' might map to a glyph for 'X,' a character code for 'T' might map to a glyph for 'Y,' etc. Thus, while "CAT" may be displayed on a screen, when the document is displayed within the screen, any search or copy/paste operations will result in "WXY." There are two drawbacks to this solution. First, reverse-engineering extraction techniques can get around the scrambling by maintaining a database of hashes for glyph data where the hashes are generated using a hashing algorithm (such as an MD5 message-digest algorithm ("MD5")), and then using the hashes to map the glyphs directly to their correct character codes. Second, if the scrambling is done in a naïve way by using a simple substitution cipher, it would be very easy for someone to deduce the correct character codes, in an automatic way and on a per document basis.

In contrast, embodiments provide character maps for fonts that can be delivered with a document, such as embedded fonts, can be produced using a process as described. Specifically, in one embodiment, glyph data (such as glyph instructions and/or coordinates) associated with the fonts are modified in such a way so that the rendered glyphs are not visibly different from the unmodified glyphs, but which affects how the glyph data is hashed, and thus, foils any attempt to map the hash of the glyph data to the correct character code for that glyph. Further, in one embodiment, character mappings are created, where several characters are mapped to one or more modified glyphs. Therefore, document providers can have simple documents (such as PDF and HTML documents) that can be viewed as intended but do not allow legible copy/paste or machine searchability by any known method.

FIG. 1 illustrates a block diagram of a system 10 that can implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a document font generation module 16, as well as other functional modules 18. Operating system 15 can provide an operating system functionality for system 10. Document font generation module 16 can provide functionality for generating fonts for documents to prevent automatic text extraction, as will be described in more detail below. In certain embodiments, document font generation module 16 can comprise a plurality of modules, where each module provides specific individual functionality for generating fonts for documents to prevent automatic text extraction. System 10 can also be part of a larger system. Thus, system 10 can include one or more additional functional modules 18 to include the additional functionality. For example, functional modules 18 may include modules that provide additional functionality, such as an "Outside In" product from Oracle Corporation, where an example of an "Outside In" product is "Clean Content."

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
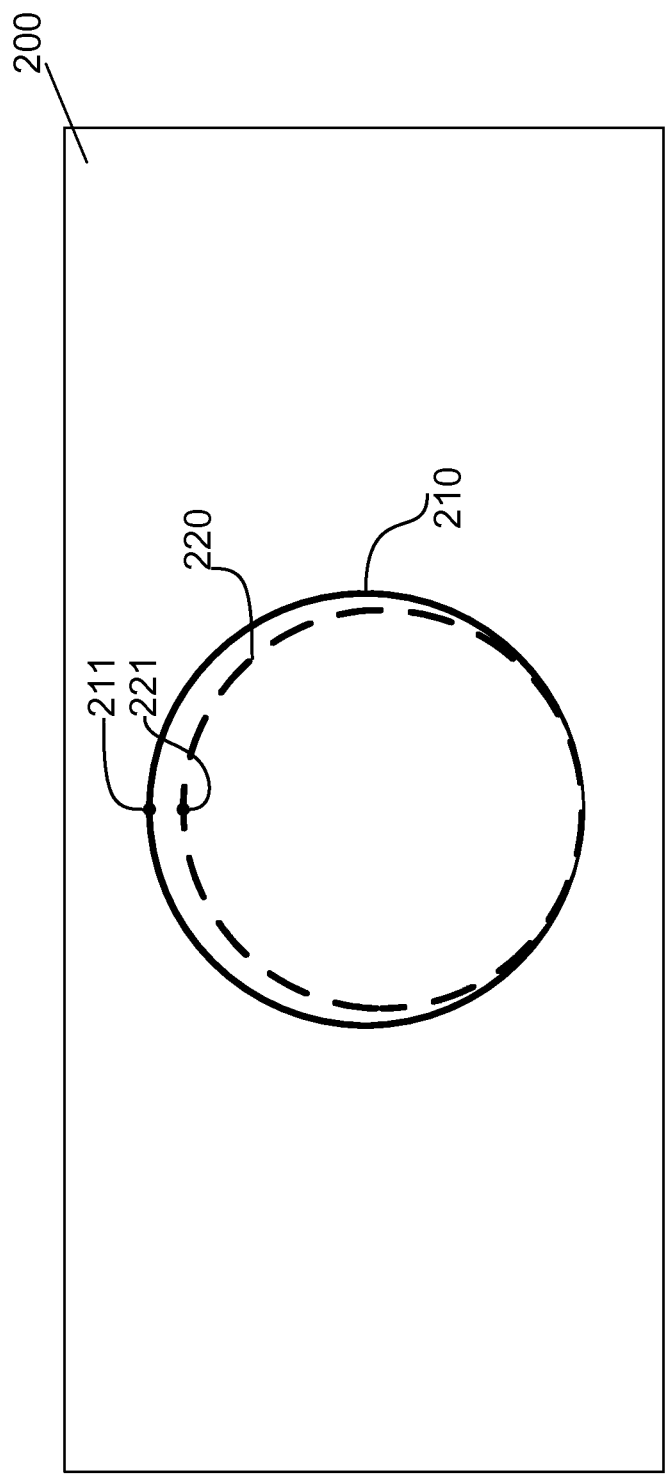
FIG. 2 illustrates the generation and modification of glyph data, in accordance with an embodiment of the invention.

FIG. 2 illustrates the generation and modification of glyph data, in accordance with an embodiment of the invention. As understood by one of ordinary skill in the art, a "glyph" is a vector drawing that can be displayed within a user interface when a document is displayed within the user interface, where the vector drawing represents at least a portion of the data, such as text, contained within the document that is displayed within the user interface. Thus, glyph data can comprise a plurality of (x, y) coordinates that define a shape of a glyph (such as one or more shape contours), and a plurality of byte code instructions that describe how to define the shape of the glyph to provide the best display of the glyph at various sizes. In certain embodiments, the plurality of byte code instructions can describe how to alter the shape contours of the glyph defined by the plurality of (x,y) coordinates in order to provide the best display of the glyph at a specified size.

According to the illustrated embodiment, grid 200 includes glyph 210, where glyph 210 is an example of a glyph that can be displayed within a user interface when the document is displayed within the user interface. In the illustrated embodiment, glyph 210 is a representation of the character "o". However, glyph 210 is merely an example of a glyph, and glyph 210 can represent any data, such as any character, or any text. Glyph 210 includes a plurality of (x, y) coordinates that correspond to pixels, where a pixel is a smallest addressable element in a display device that can display a user interface. An example coordinate, as illustrated in FIG. 2, is coordinate 211. As one of ordinary skill in the art would readily appreciate, glyph 210 is comprised of a plurality of coordinates, where the other coordinates are not specifically illustrated in FIG. 2, for sake of visibility.

As previously described, glyph 210 can be produced from glyph data, where glyph data can comprise a plurality of (x, y) coordinates that define shape contours and a plurality of byte code instructions that describe how to alter the shape when necessary to provide the best display of the glyph at various sizes. According to an embodiment, as illustrated in FIG. 2 and described below in greater detail, the glyph data that corresponds to glyph 210 can be modified in a way so that a modified glyph (i.e., modified glyph 220) can be produced from the glyph data, where modified glyph 220 can be displayed so that the appearance of modified glyph 220 is not substantially or appreciably different from the appearance of glyph 210. By "substantially different" or "appreciably different," what is meant is that the appearance of modified glyph 220 is different from the appearance of glyph 210, but that a viewer of the document cannot detect the difference in appearance between modified glyph 220 and glyph 210. As also described below in greater detail, the modification to the glyph data can comprise a modification to the one or more (x, y) coordinates, a modification to the plurality of byte code instructions, or a combination therein.

While the modification of the glyph data does not substantially or appreciably change the appearance of modified glyph 220, as compared to glyph 210, the modification does result in a different hash value for modified glyph 220 than would be obtained by hashing glyph 210. Thus, if an attempt is made to hash modified glyph 220, and then to use this hash value to look up the correct character code in a table that maps known glyph hashes to character codes, the correct character will not be found and either an incorrect character will be returned from the table look up or, more likely, no match will be found at all.

As previously described, the glyph data can be modified so that modified glyph 220 can be produced from the glyph data, rather than glyph 210. As illustrated in FIG. 2, modified glyph 220 is displayed as having a smaller height than glyph 210. More specifically, modified glyph 220 includes different (x, y) coordinates from glyph 210. For example, modified glyph 220 includes coordinate 221, which has a different position than coordinate 211 of glyph 210. While the appearance of modified glyph 220 is different than the appearance of glyph 210 in FIG. 2, one of ordinary skill in the art would readily appreciate that the difference in appearance between glyph 210 and modified glyph 220 is exaggerated in FIG. 2 (for sake of visibility), and that in alternate embodiments, glyph 210 and modified glyph 220 can have substantially identical appearances when displayed within a user interface, notwithstanding that glyph 210 and modified glyph 220 can include different (x, y) coordinates. By "substantially identical," what is meant is that the appearances of glyph 210 and modified glyph 220 appear to be identical to a viewer of the document, even though they may not be identical.

As previously described, glyph data can comprise a plurality of (x, y) coordinates that define shape contours and a plurality of byte code instructions that describe how to alter the shape when necessary to provide the best display of the glyph at various sizes. In certain embodiments, the modification of the glyph data can include a modification to one or more (x, y) coordinates of the plurality of (x, y) coordinates. According to these embodiments, the modification to the one or more (x, y) coordinates can include the modification of the position of the one or more (x, y) coordinates. The modification of the position of the one or more (x, y) coordinates can be such that the display of the glyph associated with the glyph data is not substantially altered. For example, if the position of an (x, y) coordinate is modified by less than $1/1000^{th}$ of an em-square (i.e., a grid used to define a glyph), then the difference is generally not detectable once the glyph is displayed as a collection of pixels. A majority of fonts use an em-square greater than 1000 units by 1000 units in size, and thus, moving any (x, y) coordinate one pixel in any direction generally does not result in a detectable difference. For example, if a glyph has a shape contour with seven points, the glyph coordinates alone can be modified in 16,384 different ways, which is a full one quarter of the basic multi-lingual plane character code points in a Unicode font.

In certain embodiments, the modification of the glyph data can include a modification to the plurality of byte code instructions. These embodiments can include embodiments where the em-square is less than 1000 units×1000 units. The modification to the plurality of byte code instructions can include adding one or more instructions to the plurality of byte code instructions. In alternate embodiments, the modification to the plurality of byte code instructions can include removing one or more instructions to the plurality of byte code instructions. In yet alternate embodiments, the modification to the plurality of byte code instructions can include both adding one or more instructions to the plurality of byte code instructions, and removing one or more instructions to the plurality of byte code instructions. In certain embodiments, the modification of the glyph data can include both a modification to one or more (x, y) coordinates of the plurality of (x, y) coordinates, and a modification to the plurality of byte code instructions.

In certain embodiments, modifying the glyph data is the first part of the process to produce fonts that can be delivered with a document. According to these embodiments, the second part is to create a non-reversible mapping of character codes to glyphs for each particular font that is delivered with the document.

A general description of mapping character codes to glyphs in a font is now provided. For n occurrences of a character code c in a given font for a given document, $r(\leq n)$ unique characters codes $\{c_i: 0 \leq i \leq r\}$ are mapped to m ($\leq r$ since a single character code $c_i$ can only map to a single glyph) glyphs using r mapping functions $\{f_i(c_i, g_i(c)): 0 < i < r, 0 < j < r\}$ such that each $g_i(c)$ renders the glyph for c and each $f_i()$ maps an input character code $c_i$ to that rendering. Also, for the sake of notation below, G(c) refers to a glyph mapping function for c described in an original font file.

In a standard known scenario of mapping character codes to glyphs, each unique character in an input set can map to one and only one glyph that represents the character. In other words, $r=m=1$, $c_0=c$, $g_0(c)=G(c)$. This is how conventional fonts generally map character codes to their glyph representations. Below is an example of such a known character mapping:
$c_0=c \rightarrow G(c)$
$c_0=a \rightarrow G(a)$
$c_0=t \rightarrow G(t)$ Thus, in the above example, the character code "c" maps to a glyph representation of "c," the character code "a" maps to a glyph representation of "a," and the character code "t" maps to a glyph representation of "t."

In a known simple substitution scenario, a document producer can "scramble" a font's cmap table. In other words, $r=m=1$, $c_0 \neq c$, $g_0(c)=G(c)$. This in effect changes the mapping of each character code, and thus, acts as a simple substitution cypher.

Below is an example of such a known character mapping:
$c_0=x \rightarrow G(c)$
$c_0=y \rightarrow G(a)$
$c_0=z \rightarrow G(t)$ Thus, in the above example, the character code "x" maps to a glyph representation of "c," the character code "y" maps to a glyph representation of "a," and the character code "z" maps to a glyph representation of "t." Such a simple substitution cypher is susceptible to a hashing algorithm, such as an MD5 hashing algorithm, as previously described, where a database of glyph MD5 hashes can be maintained to reverse-engineer the character mapping.

According to an embodiment of the invention, a character mapping that is equivalent to a one-time pad is provided, where a one-time pad is a type of encryption which is proven to be impossible to break. Thus, the character mapping is not susceptible to reverse-engineering using a hashing algorithm and is not subject to cryptanalysis. According to the embodiment, each instance of a character in a document is replaced with a unique $c_i$, where each unique $c_i$ maps to a different glyph in a font, where each glyph is modified differently, but each modified glyph produces the same display of the original character. In other words, $r=m=n$, $c_i \neq c$, $g_i(c) \neq g_j(c)$ and no $g_i(c)=G(c)$. Below is an example of such a character mapping:
$c_0=q \rightarrow g_0(c)$
$c_1=r \rightarrow g_1(c)$
$c_2=s \rightarrow g_2(c)$ Thus, in the above example, the character code "q" maps to a glyph representation of "c," the character code "r" maps to a glyph representation of "c," and the character code "s" maps to a glyph representation of "c." Thus, each instance of a glyph representation maps to a different character code. Likewise, each instance of a character code maps to a different glyph representation.

According to the embodiment, achieving a one-time pad when using a single font can be possible if the total number of characters in a document is less than 65,535 (i.e., a number for glyph slots available). In situations where the document exceeds 65,535 characters in a single font (roughly 58 pages), additional fonts can be created (with each font allowing for an additional 65,535 characters), and as many additional fonts as necessary can be used to preserve the one-time pad. Therefore, according to the embodiment, a one-time pad level of security (proven to be unbreakable) can be provided for a plurality of character mappings (i.e., character-code-to-glyph mappings), where the plurality of character mappings can be provided for all documents and fonts, regardless of document size.

In alternate embodiments, where a single font is required, and a document is a sufficient size to require more than 65,535 characters, a character mapping can still be provided. While the character mapping is no longer a one-time pad because there are not enough unused glyphs in the font to cover all instances of each character in the document (and thus, the encryption is no longer proven to be unbreakable), the cryptographic security of the document can still be kept at a very high level, as the pattern of the character mapping is extremely subtle, and non-trivial to break. According to the embodiment, most instances of a character in a document are replaced with a unique $c_i$, where each unique $c_i$ maps to a different glyph in a font, where each glyph is modified differently, but each modified glyph produces the same display of the original character. Furthermore, according to the embodiment, some instances of a character in a document are replaced with a $c_i$ that is identical to a $c_i$ that corresponds to a previous instance of the character, because there are no longer any unused glyphs to map the instance of the character to. In other words, $m \leq r \leq n$, $c_i \neq c$, $g_i(c) \neq g_j(c)$ for each $i \neq j$ and no $g_i(c) = G(c)$. Below is an example of such a character mapping:

$c_0 = q \rightarrow g_0(c) =$
$c_1 = r \rightarrow g_0(c)$
$c_2 = s \rightarrow g_0(c)$
$c_3 = t \rightarrow g_1(c)$ As can be seen in the example, there are multiple character codes, $c_0$, $c_1$, and $c_2$, that map to the same glyph rendering, $g_0(c)$. Thus, the unbreakable security of the one-time pad cannot be guaranteed in this embodiment. However, as long as the total number of characters in the document is not too large, the embodiment will result in an encryption that would be very difficult to crack using standard cryptographic techniques such as character frequency distributions.

Thus, when restricted to a single font, and where r and m must be less than n, a stronger restriction will generally be on m as this represents the number of glyphs in a font file, and, in practice, a little bit of cryptographic security can be traded for a smaller font size. The number of characters available to map into the glyph table, however, is still 65,535. So the cryptographic security of the document can be kept at a very high level, even if a small weakening of the mapping security embedded in the font is produced from reducing the file size. In other words, even though a little security may be traded for a smaller font size, the resulting minor security weakness is buried in the location most technically difficult to access, the font's cmap table.

As an example, given about 1125 characters per page in a document, a document can have over 58 pages before the number of characters and glyphs available for remapping in a standard Unicode font are exhausted. Therefore, if a document uses a single Unicode font, it would take 58 pages before the security of the character mapping became less strong than a one-time pad. However, the addition of additional fonts (thus, increasing file space), allows the maintenance of a one-time pad level of security for documents of any size.

Figure 3:
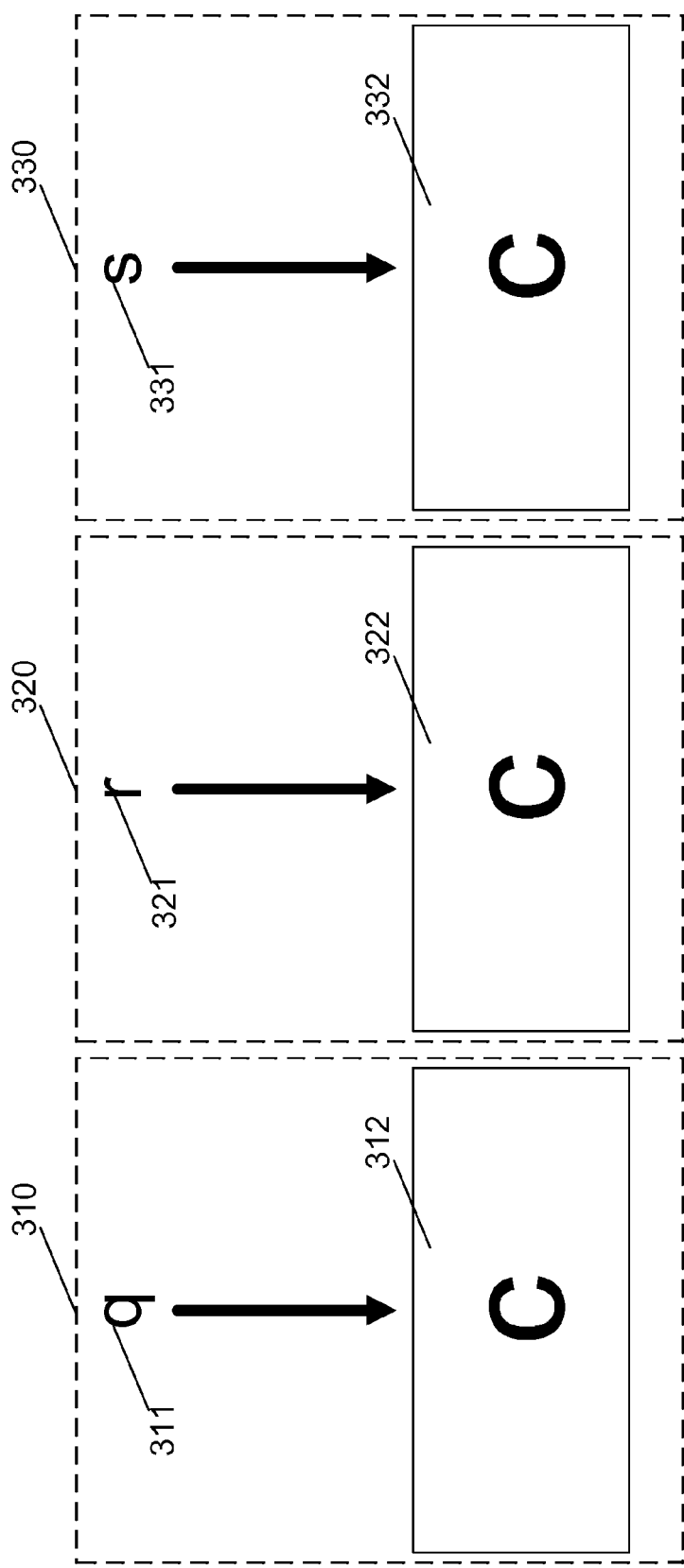
FIG. 3 illustrates the generation of a plurality of character mappings, in accordance with an embodiment of the invention.

FIG. 3 illustrates the generation of a plurality of character mappings, in accordance with an embodiment of the invention. Specifically, FIG. 3 illustrates character mappings 310, 320, and 330. As part of character mapping 310, character code 311 is mapped to glyph 312. As part of character mapping 320, character code 321 is mapped to glyph 322. As part of character mapping 330, character code 331 is mapped to glyph 332. As illustrated in FIG. 3, character code 311 is a character code of the character "q," character code 321 is a character code of the character "r," and character code 331 is a character code of the character "s." As illustrated in FIG. 3, glyphs 312, 322, and 332 are each a glyph representation of the character "c." Thus, according to the embodiment, each instance of a glyph representation maps to a different character code, and likewise, each instance of a character code maps to a different glyph representation. Thus, a one-time pad character mapping can be produced, where the one-time pad character mapping is proven to be unbreakable. Further, a "not-quite one-time pad" character mapping can alternatively be produced, where most instances of a glyph representation map to a different character, but certain instances of a glyph representation map to an identical character. Likewise, most instances of a character map to a different glyph representation, but certain instances of a character map to an identical glyph representation.

Figure 4:
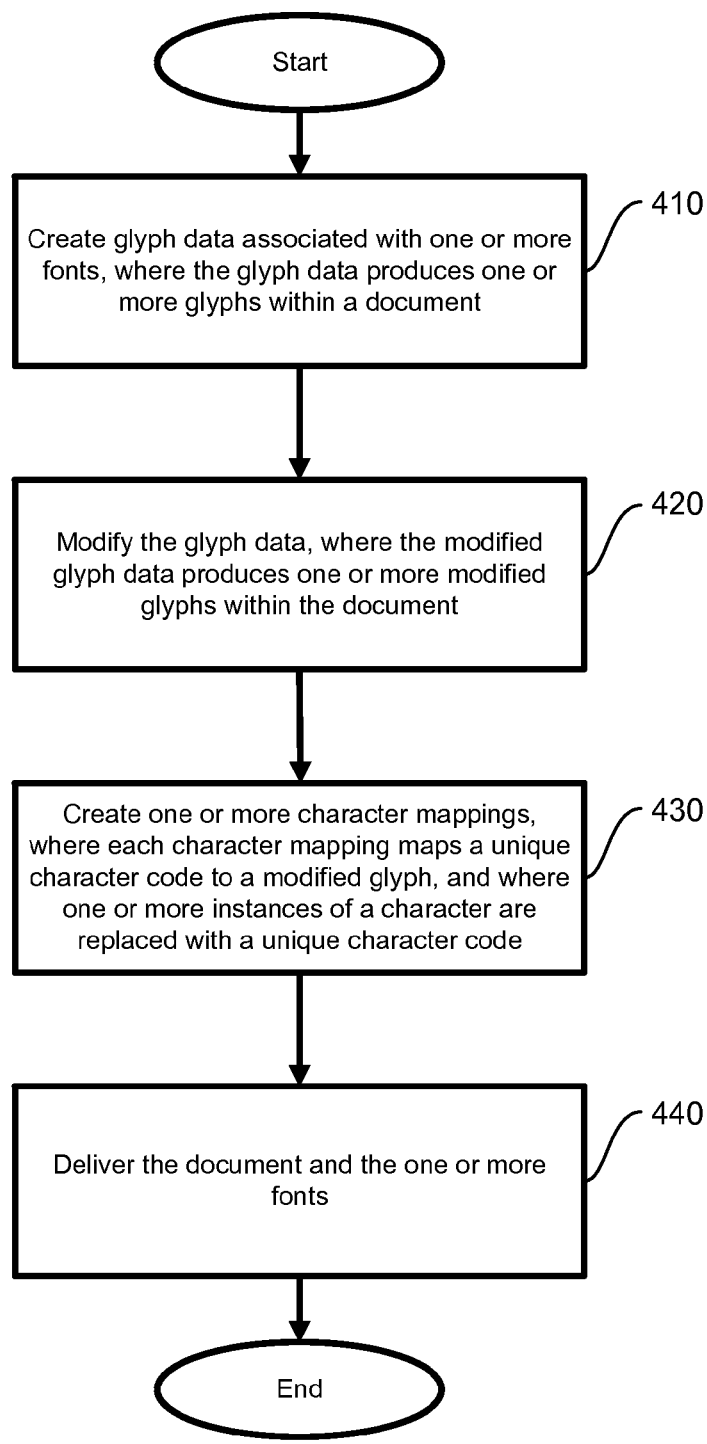
FIG. 4 illustrates a flow diagram of the functionality of a document font generation module, according to an embodiment of the invention.

FIG. 4 illustrates a flow diagram of the functionality of a document font generation module (such as document font generation module 16 of FIG. 1), according to an embodiment of the invention. In one embodiment, the functionality of the flow diagram of FIG. 4, described below, is implemented by software stored in a memory or some other computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

The flow begins and proceeds to 410. At 410, glyph data associated with each font of the one or more fonts is created, where the glyph data produces one or more glyphs that are displayed within the document. In certain embodiments, the glyph data includes a plurality of coordinates that define a shape for the one or more glyphs. In other embodiments, the glyph data includes a plurality of byte code instructions that define a shape for the one or more glyphs. In yet other embodiments, the glyph data includes both a plurality of coordinates that define a shape for the one or more glyphs, and a plurality of byte code instructions that define a shape for the one or more glyphs. In some of these embodiments, the plurality of byte code instructions can alter a shape defined by the plurality of coordinates. The flow then proceeds to 420.

At 420, the glyph data is modified, where the modified glyph data produces one or more modified glyphs, and where each modified glyph is substantially identical to a corresponding glyph when displayed within the document. In certain embodiments, the glyph data is modified by modifying at least one coordinate of the plurality of coordinates. In some of these embodiments, at least one coordinate is modified by modifying the position of at least one coordinate. In some of these embodiments, the position of at least one coordinate is modified by less than $\frac{1}{1000}^{th}$ of an em-square of each glyph of the one or more glyphs. In other embodiments, the glyph data is modified by modifying at least one byte code instruction of the plurality of byte code instructions. In some of these embodiments, one or more byte code instructions are removed. In other embodiments, one or more byte code instructions are added. In yet other embodiments, one or more byte code instructions are removed, and one or more byte code instructions are added. The flow then proceeds to 430.

At 430, one or more character mappings are created, where each character mapping maps a unique character code of one or more unique character codes to a modified glyph of the one or more modified glyphs. Thus, one or more instances of a character in the document are replaced with a unique character code of the one or more unique character codes. In some embodiments, all of the one or more unique character codes are mapped to different modified glyphs. In other embodiments, some of the one or more unique character codes are mapped to different modified glyphs. The flow then proceeds to 440.

At 440, the document and the one or more fonts are delivered. In certain embodiments, the one or more fonts are embedded fonts that are embedded within the document. In some embodiments, the document is a PDF document. In other embodiments, the document is an HTML document. The flow then ends.

In certain embodiments, a product can produce documents (such as PDF documents and HTML documents) with deliverable fonts (such as embedded fonts) using the process previously described. The product can be a document export product that provides functionality for exporting documents that include deliverable fonts. The product can also be a document creation product, where the process is part of a conversion process that creates a document.

Thus, according to an embodiment, documents with deliverable fonts specially created with character mappings that are not reversible by any known technology can be generated. The low-level source of the document itself would not be human-readable, or machine-searchable, but the document can be displayed as intended within an appropriate document view. This process can protect against current reverse-engineering techniques that are used against scrambled character mapping tables, and can protect against reverse-engineering techniques developed in the future. By providing protection at a level of a deliverable font, a customer can provide their documents in common formats delivered in traditional manners with no special plug-ins or software required. Thus, according to the embodiment, not only are documents produced that include a higher level of security, but the documents can be in common formats, such as PDF and HTML.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to generate a font for a document, the generating comprising:
   creating glyph data associated with the font, wherein the glyph data produces a glyph that is displayed within the document;
   modifying the glyph data, wherein the modified glyph data produces a modified glyph, and wherein the modified glyph is visually substantially identical to the unmodified glyph when displayed within the document;
   creating a particular character mapping, wherein the character mapping maps a unique character code to the modified glyph;
   replacing a first instance of a particular character in the document with a first unique character code, wherein the first unique character code is mapped, using the particular character mapping, to a first modified glyph; and
   replacing a second instance of the particular character in the document with a second unique character code, wherein the second unique character code is mapped, using the particular character mapping, to a second modified glyph.

2. The non-transitory computer-readable medium of claim 1, wherein the glyph data comprises a plurality of coordinates that define a shape for the glyph, and wherein the modifying the glyph data comprises modifying at least one coordinate of the plurality of coordinates.

3. The non-transitory computer-readable medium of claim 2, wherein the modifying at least one coordinate of the plurality of coordinates comprises modifying a position of the at least one coordinate of the plurality of coordinates.

4. The non-transitory computer-readable medium of claim 3, wherein the modifying the position of the at least one coordinate of the plurality of coordinates comprises modifying the position by less than $\frac{1}{1000}^{th}$ of an em-square of the glyph.

5. The non-transitory computer-readable medium of claim 1, wherein the glyph data comprises a plurality of byte code instructions that define a shape for the glyph, and wherein the modifying the glyph data comprises modifying at least one byte code instruction of the plurality of byte code instructions.

6. The non-transitory computer-readable medium of claim 1, wherein the font is an embedded font that is embedded within the document.

7. The non-transitory computer-readable medium of claim 1, wherein the document is a portable document format document.

8. The non-transitory computer-readable medium of claim 1, wherein the document is a hypertext markup language document.

9. The non-transitory computer-readable medium of claim 1, the generating further comprising delivering the document and the font.

10. The non-transitory computer-readable medium of claim 1, wherein the character mapping maps a unique character code to each character in the document.

11. A computer-implemented method for generating a font for a document, the computer-implemented method comprising:

creating glyph data associated with the font, wherein the glyph data produces a glyph that is displayed within the document;

modifying the glyph data, wherein the modified glyph data produces a modified glyph, and wherein the modified glyph is visually substantially identical to the unmodified glyph when displayed within the document;

creating a particular character mapping, wherein the character mapping maps a unique character to the modified glyph;

replacing a first instance of a particular character in the document with a first unique character code, wherein the first unique character code is mapped, using the particular character mapping, to a first modified glyph; and replacing a second instance of the particular character in the document with a second unique character code, wherein the second unique character code is mapped, using the particular character mapping, to a second modified glyph.

12. The computer-implemented method of claim 11, wherein the glyph data comprises a plurality of coordinates that define a shape for the glyph, and wherein the modifying the glyph data comprises modifying at least one coordinate of the plurality of coordinates.

13. The computer-implemented method of claim 12,
wherein the modifying at least one coordinate of the plurality of coordinates comprises modifying a position of the at least one coordinate of the plurality of coordinates; and
wherein the modifying the position of the at least one coordinate of the plurality of coordinates comprises modifying the position by less than $1/1000^{th}$ of an em-square of the glyph.

14. The computer-implemented method of claim 11, wherein the glyph data comprises a plurality of byte code instructions that define a shape for the glyph, and wherein the modifying the glyph data comprises modifying at least one byte code instruction of the plurality of byte code instructions.

15. The computer-implemented method of claim 11, wherein the character mapping maps a unique character code to each character in the document.

16. A system, comprising:
a memory configured to store one or more instructions;
a processor configured to execute the one or more instructions;
a glyph data creation module, when stored within the memory and executed by the processor, configured to create glyph data associated with a font, wherein the glyph data produces a glyph that is displayed within a document;
a glyph data modification module, when stored within the memory and executed by the processor, configured to modify the glyph data, wherein the modified glyph data produces a modified glyph, and wherein the modified glyph is visually substantially identical to the unmodified glyph when displayed within the document; and
a character mapping creation module configured to create a particular character mapping, wherein the character mapping maps a unique character code to the modified glyph;
wherein the character mapping creation module, when stored within the memory and executed by the processor, is further configured to replace a first instance of a particular character in the document with a first unique character code, wherein the first unique character code is mapped, using the particular character mapping, to a first modified glyph; and
wherein the character mapping creation module, when stored within the memory and executed by the processor, is further configured to replace a second instance of the particular character in the document with a second unique character code, wherein the second unique character code is mapped, using the particular character mapping, to a second modified glyph.

17. The system of claim 16, wherein the glyph data comprises a plurality of coordinates that define a shape for the glyphs, and wherein the glyph data modification module is further configured to modify at least one coordinate of the plurality of coordinates.

18. The system of claim 17,
wherein the glyph data modification module is further configured to modify a position of the at least one coordinate of the plurality of coordinates; and
wherein the glyph data modification module is further configured to modify the position by less than $1/1000^{th}$ of an em-square of the glyph.

19. The system of claim 16, wherein the glyph data comprises a plurality of byte code instructions that define a shape for the glyph, and wherein the modifying the glyph data comprises modifying at least one byte code instruction of the plurality of byte code instructions.

20. The system of claim 16, wherein the character mapping maps a unique character code to each character in the document.

* * * * *